May 20, 1952    C. I. WHITE, JR., ET AL    2,597,270
CABLE TENSION THERMAL COMPENSATOR
Filed Aug. 2, 1949
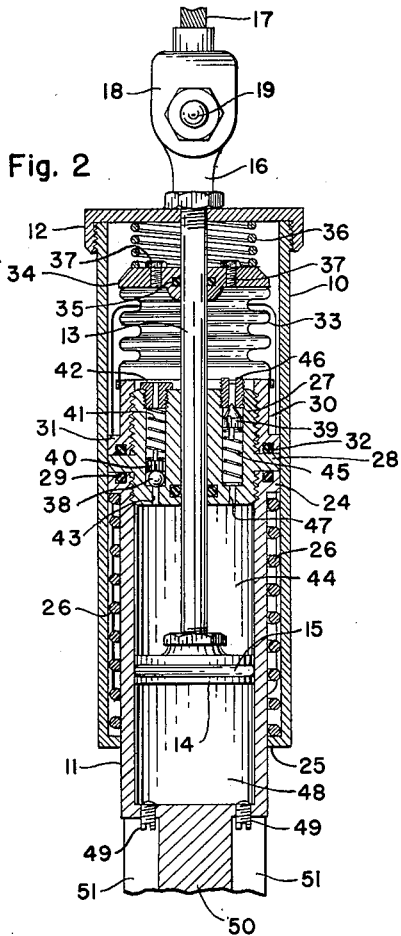
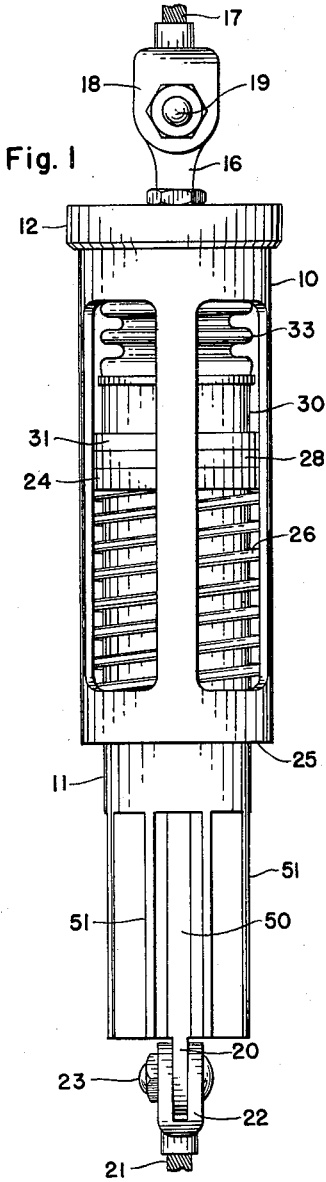
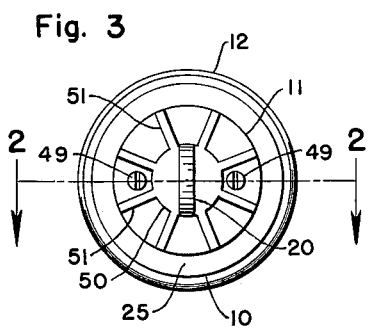
Fred R. Young, Compton I. White, Jr.,
Raymond A. Pederson & James J. Rahn
*INVENTORS*
BY *J. F. Uuerbach*
THEIR PATENT AGENT Patented May 20, 1952

2,597,270

UNITED STATES PATENT OFFICE 2,597,270

CABLE TENSION THERMAL COMPENSATOR

Compton I. White, Jr., Clark Fork, Idaho, and Fred R. Young, Raymond A. Pederson, and James J. Rahn, Seattle, Wash., assignors to Boeing Airplane Company, a corporation of Delaware Application August 2, 1949, Serial No. 108,196

11 Claims. (Cl. 74—501.5)

This invention relates to a thermally responsive compensator suitable for use in connection with cable lines to automatically maintain a predetermined tension therein despite variations of conditions which might cause elongation or contraction of the cable and/or of the support structure for the cable.

As is now thoroughly appreciated in the art, it is desirable to regulate the tension in guy wires, to compensate for effects of temperature changes on suspension spans holding pipe lines, and to regulate tension in aircraft control cables. The problem arises in the case of flexible linear elements, particularly those composed of metallic material, which may develop slackness through operating wear or through expansion and contraction attendant upon changes of temperature. Although the problem is more widely existent, it is particularly acute in aircraft involving the various cable systems employed for flight control and for other purposes. As is well known, the usual installation comprises one or more pairs of cables which extend from the pilot position to the various instrumentalities to be operated thereby. As these cables are generally formed of steel while the main structure of the aircraft through which they extend and upon which they are supported is composed of aluminum alloy or other lighter metal having a very different coefficient of expansion, it may readily be seen that under the relatively extreme range of temperature to which an aircraft becomes subjected in normal operation, that the cable runs will be definitely affected. Remembering that the length of cable run is relatively great out through the wings or fore and aft in the fuselage, it is apparent that if the cable tension is set to a desirable figure under normal temperature conditions, variation therefrom within the usual range of temperature encountered will appreciably change the cable tension since upon heating the fuselage will expand at a greater rate and consequently to greater extent than the cables so that the tension therein is greatly increased. On the other hand under conditions of decreasing temperature, the cables do not contract as much as the corresponding part of the fuselage and therefore suffer a relative increase in length which introduces slack in the control system. This may occur in such degree that the system will be rendered inoperative and it therefore has become necessary to utilize some form of regulator to compensate for variations in the cable tension.

The problem is further complicated by the fact that in the normal functioning of such cable systems, operating forces are intermittently applied to the system and these also cause changes of tension. In prior practice, the various regulators employed have utilized a spring element of predetermined strength to take up slack or to yield to increase of tension with additional means either mechanical or hydraulic in nature to lock the spring unit out of action during the period of imposition of operating forces. It has also been proposed that a tension compensator of piston-cylinder type might be employed with the compression spring replaced by a body of confined gas responsive directly to temperature changes.

The present invention represents a combination of the two concepts of tension regulation, the subject compensator combining this more rapid response to temperature changes of the fluid pressure actuated type with the more positive operation of the spring type and yielding a resultant operating characteristic which combines the best features of the two types. By way of further distinction it may be pointed out that in the prior art types employing a spring and a valve means to permit or prevent the displacement of a body of hydraulic medium, the latter served merely as a relatively non-compressible means which rendered the compensator a fixed length unit during the occurrence of operating forces in the system. However, while the hydraulic medium could and did expand or contract with changes of temperature, yet the internal arrangement of the compensator was such that these volumetric changes had no effect upon the operation of the compensator as such.

Accordingly it is a principal object of this invention to provide a cable tension compensator that is itself directly sensitive to variations of temperature conditions and which will employ thermally developed and internally active forces which will be effective in the automatic operation of the unit as a tension regulator. It is another object to provide a compensator which will depend for its operation upon resultant pressures developed by the expansive or contractive tendencies of one or more confined fluid bodies responsive to thermal changes. Still another object is to provide special means for the conduction and application of varying thermal effects to the interior of the compensator unit while yet another object is the provision of a special valving arrangement in a compensator of this type which is effective to control the operation of tension regulation.

Other objects include the more usual ones of adapting a compensator for positive operation under conditions of increase or decrease of temperature, of providing means effective to adapt the compensator for the transmission of deliberately applied forces in contrast to those thermally induced, of providing reservoir means for accommodating excess working fluid due to expansion and to provide a reserve against possible leakage and the like, including such other objects as may be revealed in the course of the following description.

The illustrative embodiment of this invention shown in the accompanying drawings incorporates the various features comprising the same, and in these drawings:

Fig. 1 shows a side elevation of the thermal type tension regulator;

Fig. 2 shows a cross-sectional view of the regulator taken on the line 2—2 of Fig. 3; and Fig. 3 is a bottom view of the same.

Referring to the drawings, the compensator has a cylindrical body consisting principally of two telescoping casing parts 10 and 11. The outer casing part 10 is closed at the top by a threaded cap 12 through the center of which extends a piston rod 13 which is threaded into the cap so that the two form a rigid unit. This piston rod 13 extends down into a piston chamber formed within the casing portion 11 where it terminates in a piston 14 equipped with the usual O-ring seal 15.

The rod 13 at its other end is formed with an eye-fitting 16 through which the compensator may be attached to a cable 17 through the medium of a bifurcated fitting 18 joined thereto by a nut and bolt combination 19. The opposite end of the compensator has similar attachment means comprising an integral apertured lug 20 to which a cable 21 can be attached through a bifurcated fitting 22 and bolt-nut connection 23. Through attachment means of this type or of suitable equivalency, the compensator unit may be inserted directly in the cable run in which the tension is to be maintained or it can be connected into the support or guy wire associated with the cable system as is well known in the art.

The inner casing part 11 at its upper end has an outwardly projecting annular shoulder 24, the outer diameter of which is such as to provide a sliding fit within the surrounding casing 10. This latter at its lower end has an inturned flange 25 so that for the extent of the overlapping portions of the casing elements 10 and 11 there is formed an annular chamber therebetween in which is contained a compression spring 26 or equivalent force element. This spring is selected to have a relative strength consistent with the predetermined tension which it is desired to maintain in the cable system.

The upper or otherwise open end of the casing part 11 is closed by a plug-like element 27 which forms one end of the piston chamber and has the piston rod 13 passing centrally therethrough. This element 27 is screw-threaded into the upper end of casing 11 and has a circumferential flange 28 which is of the same external diameter as the shoulder 24, there being an O-ring seal 29 in an annular groove between the meeting faces of the flanges 24 and 28. In addition there is a collar 30 screw-threaded onto the upper end of the plug 27 and this has a shoulder or flange 31 corresponding to flange 24 and in sealing contact with flange 28 there being an O-ring 32 in an annular groove between the meeting faces.

To the upper end of the collar 30 is attached a flexible bellows 33 which surrounds part of the piston rod 13 and at its upper end attaches to an end plate 34 surrounding the piston rod and sealed against leakage along the rod surface by an O-ring seal 35. Also in concentric relationship to the piston rod is a second spring 36 which reacts between the end plate 34 and the end cap 12. Furthermore, the plate 34 is fitted with one or more filling and vent apertures which are normally closed by threaded plugs 37. These allow the introduction of an hydraulic medium to the interior of the working chamber which is formed in part by the bellows 33.

Two similar bores are formed in the plug-like element 27 which extend longitudinally therethrough parallel to but displaced from the one through which passes the piston rod 13. These bores respectively contain valve elements 38 and 39 which are disposed so as to act in opposite directions. The valve element 38 is of ball type and has a follower 40 bearing thereon which in turn is acted upon by a coil spring 41 which is confined in the bore by an apertured, screw-threaded plug 42. This valve assembly controls the flow of hydraulic medium from the section 44 of the piston cylinder through the orifice 43 which may be of metering type and thence through the main part of the bore into the interior space of the bellows 33. This control is achieved by selection of the spring 41 to have the desired strength and it should be noted that return flow from the bellows 33 to chamber 44 would be automatically prevented. The other bore containing conical valve element 39 also contains a coil spring 45 reacting thereon, and an apertured, threaded plug 46, while the bore is connected to the interior of chamber 44 through a smaller bore 47.

Filling and vent orifices are also provided to allow introduction of hydraulic medium into the cylinder chamber 48 lying on the opposite side of piston 14. These orifices are also closed by threaded plugs 49. The lower end of the casing part 11 below the section forming the chamber 48 extends as a solid central core 50 with a circumferential series of integral and radially directed fins 51. The material, of which the casing part 11 is formed, is a relatively good conductor of heat and the fins 51 are preferably provided to more effectively transmit heat to or from the thermally responsive medium contained within the compensator cylinder so that this medium will quickly follow any changes of temperature of the surrounding atmosphere.

The operation of the compensator in taking up slack or of yielding to overload tension in the cables as results from the difference in thermal expansion of the cable and airplane structure is substantially as follows: Let is be assumed that a predetermined normal tension has been initially established in the cable system in which the present compensator is incorporated. Also that the piston chambers 44 and 48 and the space within the bellows 33 have been filled with a fluid operating medium having a suitable temperature coefficient of expansion. In this connection it may be desirable to employ different mediums on either side of the piston 14 and these may then have different coefficients of expansion since the functions of the two separated volumes of medium, are somewhat different. In order to accomplish the intended function, the medium in chamber 44 should be a relatively incompressible liquid which when trapped in the chamber 44 can serve to prevent movement of the piston 14 in the direction that would allow elongation of the compensator. In using the term "relatively incompressible liquid" the same is intended to designate that class of liquids including those commonly employed in hydraulic systems for transmitting pressures to accomplish work as in the systems employed in aircraft to retract landing gear and the like. Illustrative examples of such liquids would be water, castor oil or glycerine, as well as many commercially available compounds now obtainable for this use and which though measurably compressible when subjected to sufficient pressure yet have such a low compression rate that the effect may be ignored for all practical purposes within the working range of pressures commonly employed.

On the other hand the fluid filling chamber 48 would be selected to have a relatively high coefficient of expansion as compared to that of the material of which the compensator body is formed. A selection might be made from available gases or liquids but for convenience one of the readily available hydraulic fluids may be utilized; for instance petroleum having a specific gravity of .8467 which has a coefficient of expansion of .001039, glycerine having a coefficient of .000534, Dow-Corning Silicone Oil No. 200 having a coefficient of .0009 to .0016 or one of the aircraft hydraulic oils meeting the standards of specification AN-VV-O-336. An oil meeting this specification is WS-491 supplied by the Standard Oil Company of New Jersey. This has a coefficient of cubical expansion of .00084 per degree centigrade in the range 25° to 70° C.

Assuming for the purpose of this description that chamber 44 has been filled with glycerine while chamber 48 is filled with Dow-Corning Silicone Oil No. 200, then under the prescribed conditions, the piston 14 with its rod 13 will be displaced outwardly from the cylinder to a certain extent as shown in the drawings, thus partially compressing the spring 26. Assume further that the vehicle in which the compensator is installed undergoes a decrease of temperature either by reason of ascending to a region of lower temperature or due to the fact that the surrounding temperature of the atmosphere decreases due to natural causes. In that case, heat is extracted from the contained body of working medium within the unit and this is more particularly true of the portion contained within the cylinder portion 48. Its temperature falls correspondingly and it contracts whereupon, spring 26 is enabled to expand proportionately to cause piston 14 to move further into casing 11 to decrease the size of chamber 48. Thus the overall length of the compensator decreases.

While the foregoing action has been taking place within the compensator, the cable system and the aircraft structure supporting it have also been subjected to the same fall of temperature and have contracted each according to their separate rates with the result that while the cable (exclusive of the compensator unit) has decreased in length, the comparable aircraft structure supporting it has contracted to greater extent with the net result that the cable has undergone a relative increase of length. However the compensator unit has also contracted in length a sufficient amount to make up the difference so that the end result is the maintenance of the relative length of the cable system and a constant tension therein.

Referring again to the action occurring within the compensator under the above given conditions, movement of the piston downward causing a decrease in length of the piston chamber 48 results in a corresponding increase in length of the chamber 44. As this occurs, the reduction in pressure occurring in chamber 44 allows unseating of the valve 39 and an inflow of hydraulic medium occurs from the reserve supply within the bellows 33. As soon as the pressures become equalized, the spring 45 returns the valve to seated position.

The foregoing description of operation has assumed that no control forces have been applied to the cable system for transmission therethrough. However, if a control force is applied during this cycle, the same will tend to elongate the compensator opposing the contractile forces acting thereon and as such control forces are of considerably greater magnitude, the tendency for the hydraulic medium to flow into chamber 44 will be reversed and spring 45 will thus be able to close valve 39 which due to the trapping of the liquid and its relative incompressibility will render the compensator unit temporarily of fixed length to enable it to transmit the control force. In other words, under this condition the pressure in chamber 44 is allowed to build-up to compensate for the load applied to fittings 16 and 20. Also, the relief valve 38 is set to open at a pressure above that required to compensate for the maximum load. After the control force is removed, the valve 39 will again be free to allow more liquid to flow from bellows 33 into chamber 44 if the temperature continues to decrease.

Considering now the other possibility that the temperature may increase above the normal level or above some low that has previously been attained, the fins 51 will rise in temperature and transmit heat to the hydraulic medium in chambers 44 and 48. An expansion of the medium would accordingly follow, but being confined, a rise in pressure occurs and this pressure increase continues with continued absorption of heat until the relief level of valve 38 is reached. The resulting tension in the cable system also has its effect to this end. As soon as the relief level is reached, valve 38 is forced open, relieving the pressure in chamber 44 and allowing that in chamber 48 to force piston 14 outwardly. This causes an extension of the compensator and accompanying compression of spring 26, such extension being assisted by the above normal tension now existing in the associated cable system. When the forces acting in the system reach a state where the pressure in chamber 44 is again below the level required to overcome the pressure of spring 41, then it recloses the valve 38. Under all circumstances the spring 36 exerts a certain positive pressure upon the plate 34 and consequently upon the reserve supply of hydraulic medium within bellows 33 so that the working system will be kept full of liquid and there will be no tendency for the entrance of air which would destroy its operative effectiveness.

The illustrated embodiment of this invention is the preferred form but it is subject to various modifications of the parts and their relative arrangement to accomplish the intended result as defined by the appended claims.

We claim:

1. In a thermally responsive cable tension regulator, a regulator body having a fluid-tight chamber incorporated therein, a fluid working medium confined in said chamber to respond by expansion or contraction to temperature changes, heat transfer means comprising a portion of the regulator body having heat radiating elements formed thereon, said heat transfer means being operatively associated with the working medium to conduct heat to or from the interior of said chamber to the ambient atmosphere and displaceable means dividing the chamber into two compartments, the said means being responsive to the resultant of the forces of expansion and contraction developed in the separate bodies of working medium and adapted to vary the compensating action of the regulator.

2. A tension regulator comprising a piston and cylinder construction in which the piston divides the cylinder into separate chambers, a thermally sensitive medium in one of said chambers having a relatively high coefficient of expansion, a second medium in the other of said chambers having a lower coefficient of expansion and normally closed valve means associated with the other of said chambers adapted to open upon the attainment of a predetermined pressure therein to permit release of medium from the chamber whereby the regulator is adapted to yield to increase its length when subjected to pressure in excess of the predetermined pressure developed by thermal effect in the first said chamber.

3. A tension regulator as in claim 2 having a heat transfer element associated with the first said chamber to effect an exchange of heat between the interior of said chamber and the external atmosphere.

4. In a thermally responsive tension regulator, a first confined medium having an initial volume subject to variation due to temperature changes, a force element effective to cause the regulator to respond to contraction of the medium from the initial volume, a second confined medium of relatively incompressible nature, the said second medium being disposed in physical opposition to resist an increase from the initial volume of the first medium, and means operative upon the attainment of predetermined pressure to release said second medium and second means responsive to expansion of said first medium to effect a tension adjusting response of the regulator.

5. In a thermally responsive tension compensator comprising a piston and cylinder construction in which the piston divides the cylinder into separate chambers, a thermally sensitive medium in one of said chambers having an initial volume subject to variation due to temperature changes, a force element acting to move the piston in direction tending to compress said medium, a second medium disposed in the other of said chambers, the second medium being a relatively incompressible fluid normally blocking movement of the piston in direction tending to compress said second medium, and valve mechanism operative upon the attainment of a predetermined pressure to release the second medium thereby unblocking the piston.

6. In combination in a cable tension compensator comprising three chambers subject to variations of pressure, a fluid medium of a relatively high coefficient of expansion contained in the first of said chambers, displaceable sealing means separating the second of said chambers from the first, a relatively incompressible fluid medium filling the second of said chambers, a valve mechanism controlling fluid flow from the second to the third said chambers, and heat transfer means in operative association with the fluid medium filling the first said chamber.

7. A cable tension compensator comprising a cylinder having closed ends, a piston slidably mounted within said cylinder and forming a seal for a thermally responsive medium filling the space within the cylinder between the piston and one closed end, a piston rod carried by the piston and extending from one end of the cylinder, the piston rod and the cylinder providing connections to separate cable ends, a reservoir, a relatively incompressible liquid filling the reservoir and the space between the piston and the other closed end of the cylinder, and a valved communication between the reservoir and the cylinder.

8. In a cable tension compensator comprising a cylinder enclosing a piston and divided thereby into two chambers, a thermally responsive medium filling one of said chambers, a force element acting on said piston in direction tending to compress said thermally responsive medium, a piston rod extending from the piston to a point external of the cylinder, the piston rod and the cylinder providing connections to separate cable ends, a reservoir, a relatively incompressible liquid filling the reservoir and the second of said cylinder chambers, a valved conduit extending from the second chamber to the reservoir, and a heat transfer element extending from the first chamber.

9. In a thermally responsive tension compensator of variable effective length, a force element acting to change the effective length of the compensator, a confined body of working medium subject to appreciable variations of volume as the result of temperature variations therein, the said working medium consisting of two separately contained fluids, at least one of which is a relatively incompressible liquid, means subject to displacement in accordance with changes of the volumes of the confined fluids, the said means being adapted upon expansion of the working medium to overcome the force element to cause a change in length of the compensator and heat transfer means comprising a finned portion of the compensator adapted to thermally link the body of working medium to the ambient atmosphere.

10. In combination in a cable tension compensator incorporating three chambers adapted to contain fluid mediums subject to variations of volume and pressure, a primary fluid medium of a relatively high coefficient of expansion wholly confined in the first of said chambers to constitute a temperature responsive force developing working medium for the compensator, a displaceable bulkhead between the first and second chambers, a relatively incompressible fluid medium filling the second of said chambers, a first normally closed valve means responsive to a predetermined pressure to permit a flow of fluid from the second to the third said chambers, a second normally closed valve means responsive to a predetermined pressure to permit flow of fluid from the third to the second of said chambers, a force transmitting means extending from the displaceable bulkhead to the exterior of the compensator, and connection means attached thereto.

11. In a thermally responsive tension compensator comprising a casing containing a force responsive member, two confined bodies of thermally sensitive medium disposed to act independently on said force responsive member, the first of said bodies of thermally sensitive medium having an initial volume subject to variation due to temperature changes, a force element acting to move the force responsive member in direction to oppose the force of expansion of the first said body, the second of said bodies of thermally sensitive medium being a liquid acting by its resistance to compression to normally block that movement of the force responsive member induced by expansion of the first said body and pressure responsive mechanism operating upon the attainment of a predetermined pressure to release the second body of medium to thereby unblock movement of the force responsive member.

COMPTON I. WHITE, JR.
FRED R. YOUNG.
RAYMOND A. PEDERSON.
JAMES J. RAHN.

REFERENCES CITED

The following references are of record in the file of this patent:

UNITED STATES PATENTS

| Number | Name | Date |
|---|---|---|
| 259,865 | Johnson | June 20, 1882 |
| 2,323,352 | Pitts | July 6, 1943 |
| 2,365,247 | Carlton | Dec. 19, 1944 |
| 2,375,050 | Tauscher | May 1, 1945 |
| 2,405,062 | Sheldon | July 30, 1946 |
| 2,405,377 | Sturgess | Aug. 6, 1946 |
| 2,504,988 | Kronlund | Apr. 25, 1950 |